United States Patent
Onomura

(10) Patent No.: US 7,986,359 B2
(45) Date of Patent: Jul. 26, 2011

(54) ELECTRONIC IMAGE PICKUP APPARATUS AND ELECTRONIC IMAGE PICKUP METHOD

(75) Inventor: Kenichi Onomura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 1072 days.

(21) Appl. No.: 11/699,595

(22) Filed: Jan. 29, 2007

(65) Prior Publication Data

US 2007/0195181 A1 Aug. 23, 2007

(30) Foreign Application Priority Data

Feb. 22, 2006 (JP) ................. 2006-045454

(51) Int. Cl.
*H04N 3/14* (2006.01)
*H04N 9/73* (2006.01)
*G06K 9/36* (2006.01)

(52) U.S. Cl. .............. 348/273; 348/223.1; 382/276

(58) Field of Classification Search .......... 348/223.1, 348/220.1, 272–280, 222.1; 382/276
See application file for complete search history.

(56) References Cited

U.S. PATENT DOCUMENTS

| 4,899,212 A | * | 2/1990 | Kaneko et al. | 348/220.1 |
| 5,231,500 A | * | 7/1993 | Miyaji et al. | 348/223.1 |
| 2003/0030729 A1 | * | 2/2003 | Prentice et al. | 348/220.1 |

FOREIGN PATENT DOCUMENTS

| JP | 2001-17385 | | 1/2001 | |
| JP | 2001-339734 | | 12/2001 | |
| JP | 2001339734 | * | 12/2001 | |
| JP | 2004-328460 | * | 11/2004 | ............ 9/73 |
| JP | 2008-36390 | | 2/2008 | |
| JP | 2009-78155 | | 4/2009 | |

OTHER PUBLICATIONS

Notice of Reasons for Rejection for Japanese Patent Application No. 2010-542854, mailed Dec. 21, 2010 (3 pgs.) with translation (4 pgs.).

* cited by examiner

*Primary Examiner* — Nhan T Tran
(74) *Attorney, Agent, or Firm* — John C. Pokotylo; Straub & Pokotylo

(57) ABSTRACT

An electronic image pickup apparatus comprises a color image pickup element having a plurality of drive modes including at least the first drive mode and the second drive mode. The color-conversion parameter storage section of the apparatus stores the first color-conversion parameter. The color-conversion parameter computing section of the apparatus computes from the first color-conversion parameter the second color-conversion parameter. The computation parameter storage section of the apparatus stores the computation parameter for computing the second color-conversion parameter. The color-conversion section of the apparatus converts the color data acquired by the color image pickup element in the first drive mode according to the first color-conversion parameter and the color data acquired by the color image pickup element in the second drive mode according to the second color-conversion parameter.

17 Claims, 11 Drawing Sheets

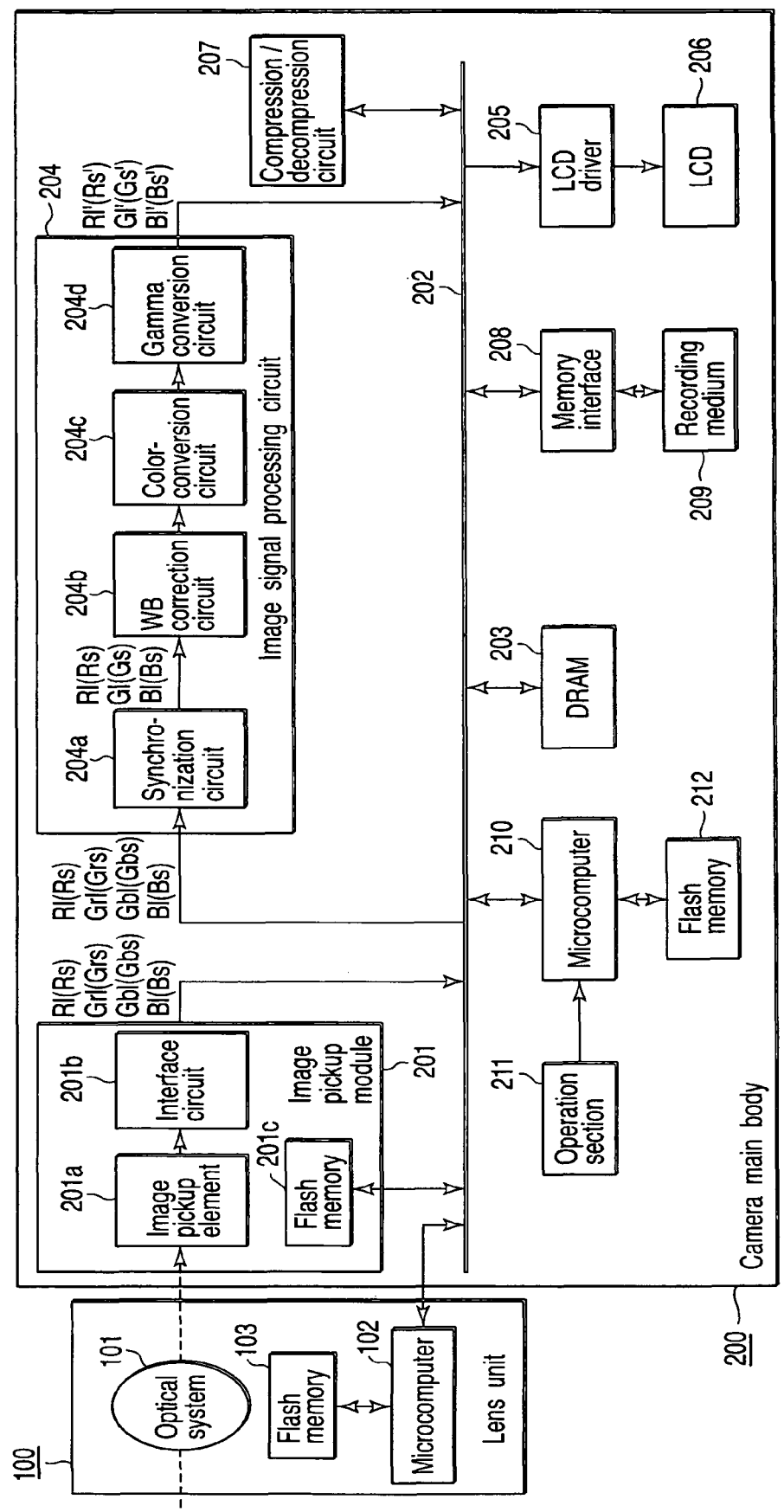
F I G. 1

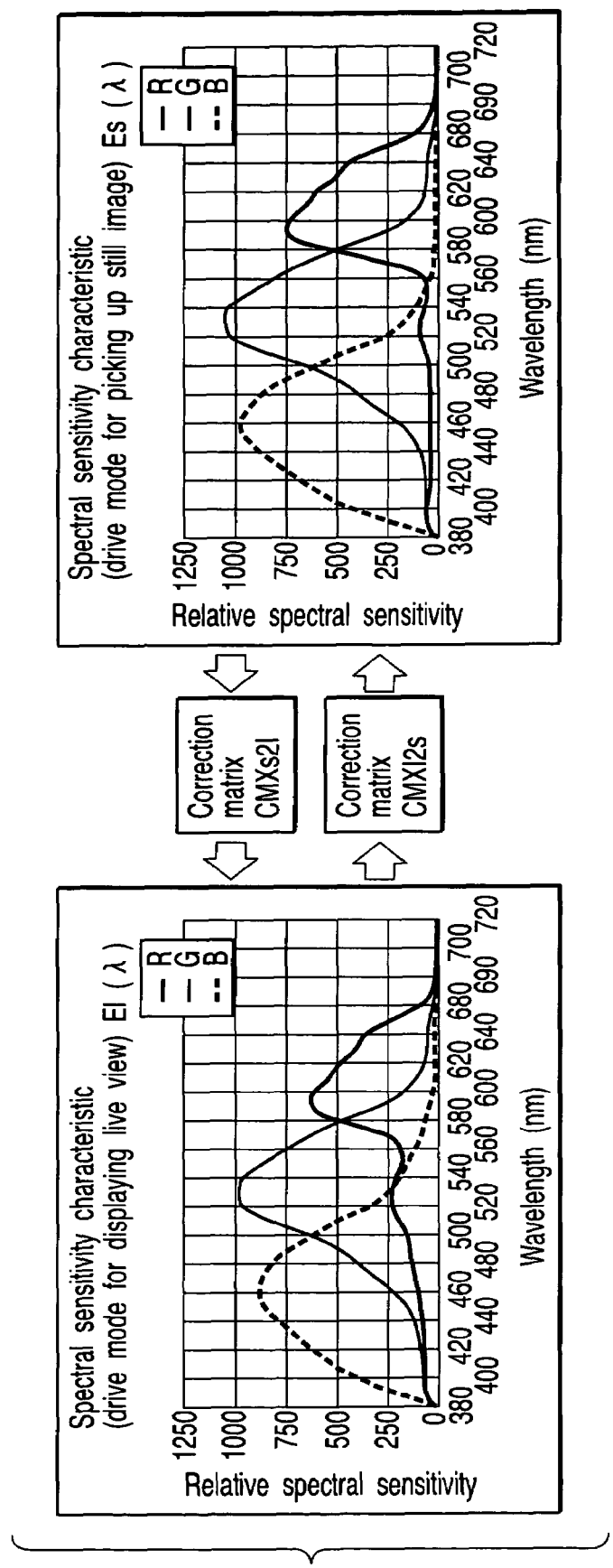
F I G. 5

ELECTRONIC IMAGE PICKUP APPARATUS AND ELECTRONIC IMAGE PICKUP METHOD

CROSS-REFERENCE TO RELATED APPLICATIONS

This application is based upon and claims the benefit of priority from prior Japanese Patent Application No. 2006-045454, field Feb. 22, 2006, the entire contents of which are incorporated herein by reference.

BACKGROUND OF THE INVENTION

1. Field of the Invention

This invention relates to an electronic image pickup apparatus and an electronic image pickup method that utilize a color image pickup element and, more particularly, it relates to an electronic image pickup apparatus capable of picking up a still image and displaying a live view by utilizing a color image pickup element and also to an electronic image pickup method to be used for such an apparatus.

2. Description of the Related Art

Some known electronic image pickup apparatus such as digital still cameras (to be simply referred to as cameras if appropriate) are equipped with a color image pickup element having a plurality of different drive modes. For example, digital still cameras have a drive mode for picking up a still image and a drive mode for displaying a live view. Since the image quality of the still image to be recorded is most important in the drive mode for picking up a still image, all the outputs from the effective pixels of the image pickup element are read. On the other hand, in the drive mode for displaying a so-called live view of displaying the image obtained by the image pickup element on the display section, which may typically be an LCD, on a real-time basis, the output of the image pickup element is partly thinned to feasibly display the picked up image on a real-time basis by reducing the time for reading out the output of the image pickup element and subsequently processing the image.

Meanwhile, it is known that the spectral sensitivity characteristics of the same image pickup element vary depending on the drive mode. For example, it is known that an NMOS-type image pickup element shows a stronger color mixing tendency in the drive mode for displaying a live view than in the drive mode for picking up a still image.

Under these circumstances, image pickup elements are required to show the same color reproducibility both when displaying a live view and when picking up a still image. For example, Jpn. Pat. Appln. Publication No. 2001-339734 discloses a technique of computationally determining the spectral characteristics at the time of an image pickup operation (comprehensive spectral characteristics) from the spectral characteristics stored in the memory of a unit (e.g., a lens unit or a image pickup unit) that can be removably fitted to the camera being used for the operation and the spectral characteristics that correspond to the image pickup condition of the camera main body and are stored in the memory in the camera main body. Then, the white balance correction value and the color-conversion value are computed according to the computationally determined comprehensive spectral characteristics.

To realize the same color reproducibility both for picking up a still image and for displaying a live view by means of the technique disclosed in Jpn. Pat. Appln. Publication No. 2001-339734, the spectral sensitivity characteristics of the image pickup element for the time of picking up a still image and the spectral sensitivity characteristics of the image pickup element for the time of displaying a live view are stored and the white balance correction value and the color-conversion value for the still image and those for displaying a live view are computed from the respective spectral sensitivity characteristics, the spectral radiance characteristic of the light source at the time of the image pickup operation, the spectral transmittance characteristic of the optical lens of the camera, the spectral reflectance characteristic of the target color and the RGB value of the target color. The process of white balance correction and that of color-conversion for displaying a live view are executed according to the white balance correction value and the color-conversion value at the time of displaying a live view in the mode of displaying a live view, whereas that processing for picking up a still image is executed according to the white balance correction value and the color-conversion value at the time of picking up a still image. With this arrangement, it is possible to obtain an image to be displayed in the drive mode for displaying a live view and an image picked up in the drive mode for picking up a still image with the same color reproducibility. In other words, the colors of the image displayed as live view agree with the colors of the still image that is picked and reproduced.

BRIEF SUMMARY OF THE INVENTION

According to a first aspect of the present invention, there is provided an electronic image pickup apparatus comprising: a color image pickup element which has a plurality of drive modes including at least a first drive mode and a second drive mode; a color-conversion parameter storage section which stores a first color-conversion parameter for color-converting a color data acquired by the color image pickup element in the first drive mode; a color-conversion parameter computing section which computes from the first color-conversion parameter a second color-conversion parameter in order to color-convert a color data acquired by the color image pickup element in the second drive mode; a computation parameter storage section which stores a computation parameter for computing the second color-conversion parameter; and a color-conversion section which color-converts the color data acquired by the color image pickup element in the first drive mode according to the first color-conversion parameter and also color-converts the color data acquired by the color image pickup element in the second drive mode according to the second color-conversion parameter.

According to a second aspect of the present invention, there is provided an electronic image pickup apparatus, comprising: a color image pickup element which has a plurality of drive modes including at least a first drive mode and a second drive mode; an optical lens which converges light from a subject to the color image pickup element; a spectral sensitivity characteristics storage section which stores the spectral sensitivity characteristics corresponding to the first drive mode of the color image pickup element; a first color-conversion parameter computing section which computes a first color-conversion parameter for color-converting a color data acquired by the color image pickup element in the first drive mode according to the spectral sensitivity characteristics; a second color-conversion parameter computing section which computes from the first color-conversion parameter the second color-conversion parameter for color-converting a color data acquired by the color image pickup element in the second drive mode; a computation parameter storage section which stores the computation parameter for computing the second color-conversion parameter; and a color-conversion section which color-converts the color data acquired by the color image pickup element in the first drive mode according to the first color-conversion parameter and also color-converts the color data acquired by the color image pickup element in the second drive mode according to the second color-conversion parameter.

According to a third aspect of the present invention, there is provided an electronic image pickup apparatus, comprising: a color image pickup element which has a plurality of drive modes including at least a first drive mode and a second drive mode; an optical lens which converges light from a subject to the color image pickup element; a spectral sensitivity characteristics storage section which stores a first spectral sensitivity characteristics corresponding to the first drive mode of the color image pickup element; a spectral sensitivity characteristics computing section which computes a second spectral sensitivity characteristics corresponding to the second drive mode of the color image pickup element according to the first spectral sensitivity characteristics; a spectral sensitivity characteristics computation parameter storage section which stores the computation parameter for computing the second spectral sensitivity characteristics; a color-conversion parameter computing section which computes a first color-conversion parameter for converting a color data acquired by the color image pickup element in the first drive mode according to the first spectral sensitivity characteristics and also computing a second color-conversion parameter for converting a color data acquired by the color image pickup element in the second drive mode according to the second spectral sensitivity characteristics; a color-conversion computation parameter storage section which stores the computation parameter for computing the first and second color-conversion parameters; and a color-conversion section which color-converts the color data acquired by the color image pickup element in the first drive mode according to the first color-conversion parameter and also color-converts the color data acquired by the color image pickup element in the second mode according to the second color-conversion parameter.

According to a fourth aspect of the present invention, there is provided an electronic image pickup method for a color image pickup element having a plurality of drive modes including at least a first drive mode and a second drive mode, the method comprising: computing a second color-conversion parameter for color-converting the color data acquired by the color image pickup element in the second drive mode by subjecting a first color-conversion parameter to linear transformation; and color-converting a color data acquired by the color image pickup element in the first drive mode by subjecting the color data to linear transformation according to the first color-conversion parameter and also color-converting a color data acquired by the color image pickup element in the second drive mode by subjecting the color data to linear transformation according to the second color-conversion parameter.

According to a fifth aspect of the present invention, there is provided an electronic image pickup method for a color image pickup element having a plurality of drive modes including at least a first drive mode and a second drive mode, the method comprising: computing a first color-conversion parameter for color-converting a color data acquired by the color image pickup element in the first drive mode according to a spectral sensitivity characteristics corresponding to the first drive mode of the color image pickup element; computing a second color-conversion parameter for color-converting a color data acquired by the color image pickup element in the second drive mode by subjecting the first color-conversion parameter to linear transformation; and color-converting a color data acquired by the color image pickup element in the first drive mode by subjecting the color data to linear transformation according to the first color-conversion parameter and also color-converting a color data acquired by the color image pickup element in the second drive mode by subjecting the color data to linear transformation according to the second color-conversion parameter.

According to a sixth aspect of the present invention, there is provided an electronic image pickup method for a color image pickup element having a plurality of drive modes including at least a first drive mode and a second drive mode, the method comprising: computing a second spectral sensitivity characteristics corresponding to the second drive mode of the color image pickup element by subjecting a first spectral sensitivity characteristics corresponding to the first drive mode of the color image pickup element to linear transformation; computing a first color-conversion parameter for color-converting a color data acquired by the color image pickup element in the first drive mode according to the first spectral sensitivity characteristics; computing a second color-conversion parameter for converting a color data acquired by the color image pickup element in the second drive mode according to the second spectral sensitivity characteristics; and color-converting the color data acquired by the color image pickup element in the first drive mode to color-conversion according to the first color-conversion parameter and also color-converting the color data acquired by the color image pickup element in the second drive mode to conversion according to the second color-conversion parameter.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram of the first embodiment of electronic image pickup apparatus according to the present invention, showing the configuration thereof;

FIG. 5 is a schematic illustration of the relationship between the spectral sensitivity characteristic $El(\lambda)$ and the spectral sensitivity characteristic $Es(\lambda)$;

DETAILED DESCRIPTION OF THE INVENTION

Figure 2:
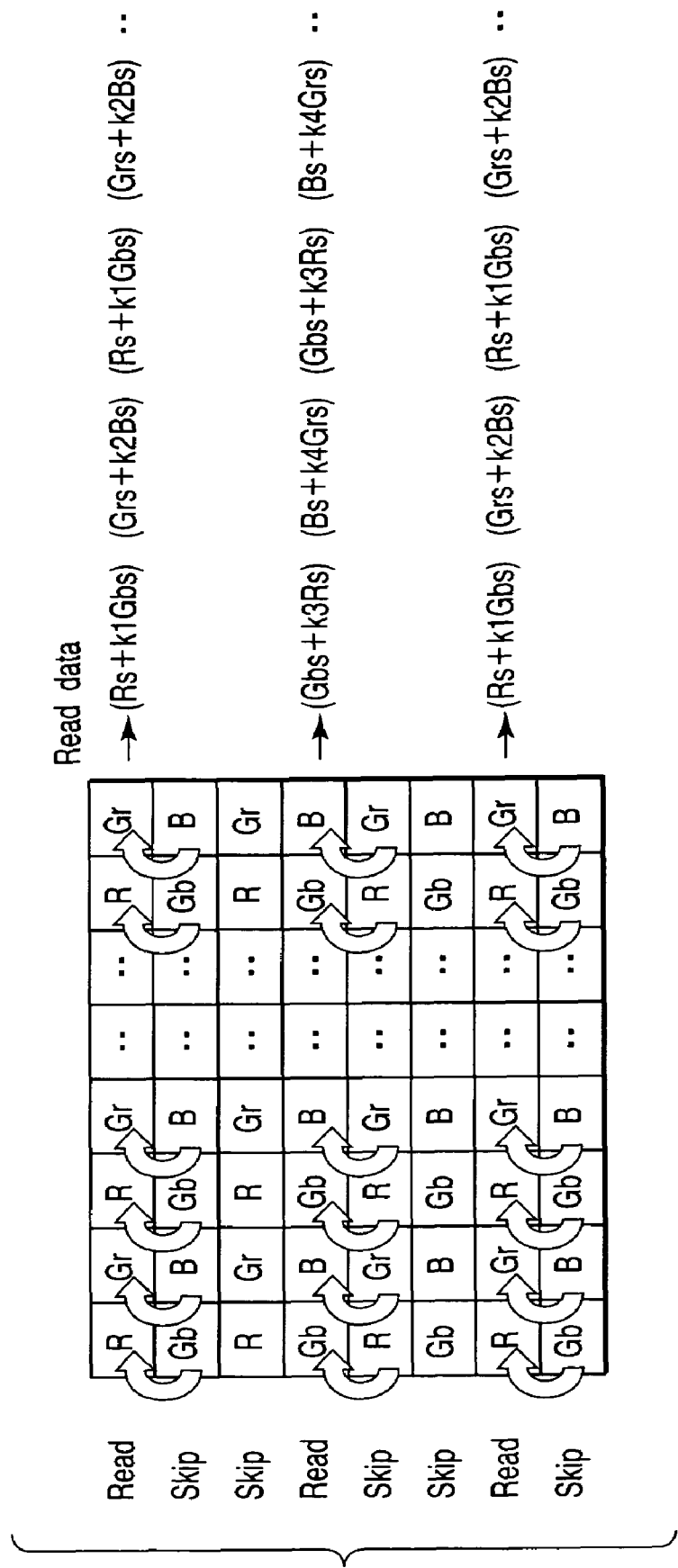
FIG. 2 is a schematic illustration of color mixing of an image pickup element.

Now, the present invention will be described in greater detail by referring to the accompanying drawings that illustrate embodiments of the invention.

First Embodiment

FIG. 1 is a schematic block diagram of the first embodiment of electronic image pickup apparatus according to the present invention, showing the configuration thereof. The embodiment of FIG. 1 is a single-lens reflex digital still camera comprising a lens unit 100 and a camera main body 200 that can be detachably fitted to each other.

The lens unit 100, which is an optical lens, has an optical system 101 including a focusing lens, an aperture, a zoom lens and so on. The optical system 101 converges light from a subject (not shown) to the image pickup element 201a in the camera main body. Although not shown in FIG. 1, the lenses of the optical system 101 are driven by a lens drive mechanism (not shown) and the aperture is driven by an aperture drive mechanism (not shown).

The lens unit 100 is provided with a microcomputer 102 and a flash memory 103. The microcomputer 102 controls various components in the lens unit 100 according to directives from the camera main body 200. For example, the microcomputer 102 adjusts the focal point of the optical system 101 by driving the lens drive mechanism (not shown) and also the exposure of the image pickup element 201a by driving the aperture drive mechanism (not shown) according to directives from the camera main body 200. The flash memory 103 operates as spectral transmittance storage section and stores various programs to be executed by the microcomputer 102 and data relating to the optical system 101. In the first embodiment, at least the spectral transmittance characteristics (the lens transmittance characteristic $T(\lambda)$) of the optical system 101 are stored in the flash memory 103. Additionally, information necessary for auto-focusing of the optical system 101 such as information relating to the focal length may be stored in the flash memory 103.

The lens unit 100 and the camera main body 200 can communicate with each other when they are fitted to each other. More specifically, when the lens unit 100 is mounted on the camera main body 200, it can transmit data relating to the optical system 101 that are stored in the flash memory 103 to the camera main body 200.

The camera main body 200 includes an image pickup module 201, a bus 202, a DRAM 203, an image signal processing circuit 204, an LCD driver 205, an LCD 206, a compression/decompression circuit 207, a memory interface 208, a recording medium 209, a microcomputer 210, an operation section 211 and a flash memory 212.

The image pickup module 201 is a module for picking up the image of the subject entering it via the optical system 101 and obtains image data (RAW data). The image pickup module 201 includes an image pickup element 201a, an interface circuit 201b and a flash memory 201c.

As shown in FIG. 2, the image pickup element 201a is a color image pickup element having color filters of a Bayer array arranged at the front surface. The Bayer array shown in FIG. 2 is formed by alternately arranging lines including R pixels and G (Gr) pixels and lines including G (Gb) pixels and B pixels. The image pickup element 201a may be a MOS-type element or a CCD-type element.

The image pickup element 201a receives the image of the subject entering it via the optical system 101 as rays of light by means of the pixels thereof, performs an operation of photoelectric conversion and outputs the electric charges obtained as a result of the photoelectric conversion as image signal. In the first embodiment, the image pickup element 201a can be driven to operate at least in two modes including a drive mode for picking up a still image (the first drive mode) and a drive mode for displaying a live view (the second drive mode). All the outputs from the effective pixels of the image pickup element are read in the first drive mode for picking up a still image because the image quality of the still image to be recorded is most important. On the other hand, the output of the image pickup element is partly thinned and read in order to feasibly display the picked up image on a real-time basis in the drive mode for displaying a live view of display.

The drive modes of the image pickup element 201a will be described further by referring to FIG. 2. In the drive mode for picking up a still image, all the pixels of the image pickup element 201a shown in FIG. 2 are driven and the electric charges thereof are read. As a result, a large number of pixels are used to record a still image and hence it is possible to produce a high quality image. On the other hand, in the drive mode for displaying a live view, only some of the pixels (the pixels on the lines indicated by Read in the instance of FIG. 2) are driven and the electric charges thereof are read. With this arrangement, it is possible to reduce the time required to read the output of the image pickup element and the time required to carry out the subsequent image processing operation.

The interface circuit 201b executes analog processing for removing noise from, rectifying the waveform of and amplifying the output level of the image signal read from the image pickup element 201a and converts the image signal subjected to the analog processing into a digital signal to obtain image data (RAW data). The flash memory 201c that operates as spectral sensitivity characteristics storage section stores the spectral sensitivity characteristics (the spectral sensitivity characteristic $Es(\lambda)$ for picking up a still image) that are computationally determined on the basis of the image data obtained by driving the image pickup element 201a in the mode for picking up a still image.

The bus 202 is connected to the image pickup module 201, the DRAM 203, the image signal processing circuit 204, the LCD driver 205, the compression/decompression circuit 207, the memory interface 208 and the microcomputer 210 and operates as transfer path for transferring various data generated in the camera to various sections in the camera. The image data (RAW data) acquired by the image pickup module 201 are transferred to the DRAM 203 via the bus 202 and stored there. The DRAM 203 is a storage section for temporarily storing the image data obtained by the interface circuit 201b of the image pickup module 201 and the image data processed by the image signal processing circuit 204 and the compression/decompression circuit 207 as well as other various data.

The image signal processing circuit 204 reads the image data (RAW data) stored in the DRAM 203 and performs an image processing operation on them. The image signal processing circuit 204 includes a hsynchronization circuit 204a, a white balance (WB) correction circuit 204b, a color-conversion circuit 204c and a gamma conversion circuit 204d.

The synchronization circuit 204a generates image data where a pixel component is formed by the three colors of R, G and B by interpolation from the RAW data of a Bayer array. The WB correction circuit 204b corrects the white balance by multiplying the R data and the B data of the output of the synchronization circuit 204a by the white balance gain indicated by the microcomputer 210. The color-conversion circuit 204c corrects the colors of the image data by means of linear transformation of multiplying the output of the WB correction circuit 204b by the color matrix indicated by the microcomputer 210. The WB correction circuit 204b and the color-conversion circuit 204c may be collectively referred to as color-conversion section.

In a drive mode such as the drive mode for displaying a live view where only some of the pixels of the image pickup element 201a are driven and the outputs of those pixels are read, the electric charges of some of the pixels that are not driven can leak out during the operation of driving the former pixels. Then, the pixels whose outputs are to be read can be mixed with some other color or colors to give rise to a problem of color mixing. Quantity of the electric charges that leak out vary depending on the configuration of the image pickup element and the drive mode, although electric charges can leak out remarkably from a MOS-type image pickup element to give rise to the problem of color mixing.

To eliminate the problem of color mixing and achieve the same color reproducibility for both displaying a live view and picking up a still image, the operation of white balance correction and color-conversion need to be conducted appropriately for both displaying a live view and picking up a still image. The method for this will be described later.

The gamma conversion circuit 204d executes a gamma conversion (gradation conversion) process on the output of the color-conversion circuit 204c to correct the gradation of the image data so as to make it suitable for displaying and printing. The image data processed by the gamma conversion circuit 204d are transferred to the DRAM 203 via the bus 202 and stored there.

The LCD driver 205 operates to display an image on the LCD 206. For example, when displaying a live view, the LCD driver 205 reads the image data acquired by the image pickup module 201 and subjected to an image processing operation for displaying a live view by the image signal processing circuit 204 from the DRAM 203, converts them into a video signal and displays a live view on the LCD 206 according to the video signal.

When picking up a still image, the compression/decompression circuit 207 reads the image data acquired by the image pickup module 201, subjected to a image processing operation for picking up a still image by the image signal processing circuit 204 from the DRAM 203 and compresses them according to, for example, the JPEG system. The compressed image data are stored in the DRAM 203 and recorded on the recording medium 209 via the memory interface 208. There are no particular limitations to the recording medium 209 and may be a memory card. When reproducing the still image, the compression/decompression circuit 207 reads the image data of the still image recorded on the recording medium 209 and decompresses them. The decompressed image data are temporarily stored in the DRAM 203 and subsequently displayed on the LCD 206 by the LCD driver 205.

The microcomputer 210 that operates as the first color-conversion parameter computing section and the second color-conversion parameter computing section comprehensively controls the various process sequences of the camera main body 200. The microcomputer 210 is connected to the operation section 211 and the flash memory 212. The operation section 211 includes various operation members such as a power button for turning on the power supply of the camera and a release button for carrying out a still image picking up operation. As the operation section 211 is operated by the user, the microcomputer 210 executes a process such as a process for picking up a still image according to the corresponding sequence. The flash memory 212 that operates as a color-conversion computation parameter storage section stores, as parameters for computationally determining the white balance gain and color matrix in the microcomputer 210, the spectral radiance characteristics (the target light source spectral radiance characteristic $I(\lambda)$) of the target light source of white balance correction and color-conversion (e.g., daylight, standard light source A or white fluorescent lamp), the spectral reflectance characteristics (the target spectral reflectance characteristic $R(\lambda)$) of the target color, the RGB value (the target color RGB value $D(R, G, B)$) of the target color and the correction matrix CMXl2s, which is a computation parameter as will be described in greater detail hereinafter.

Figure 3:
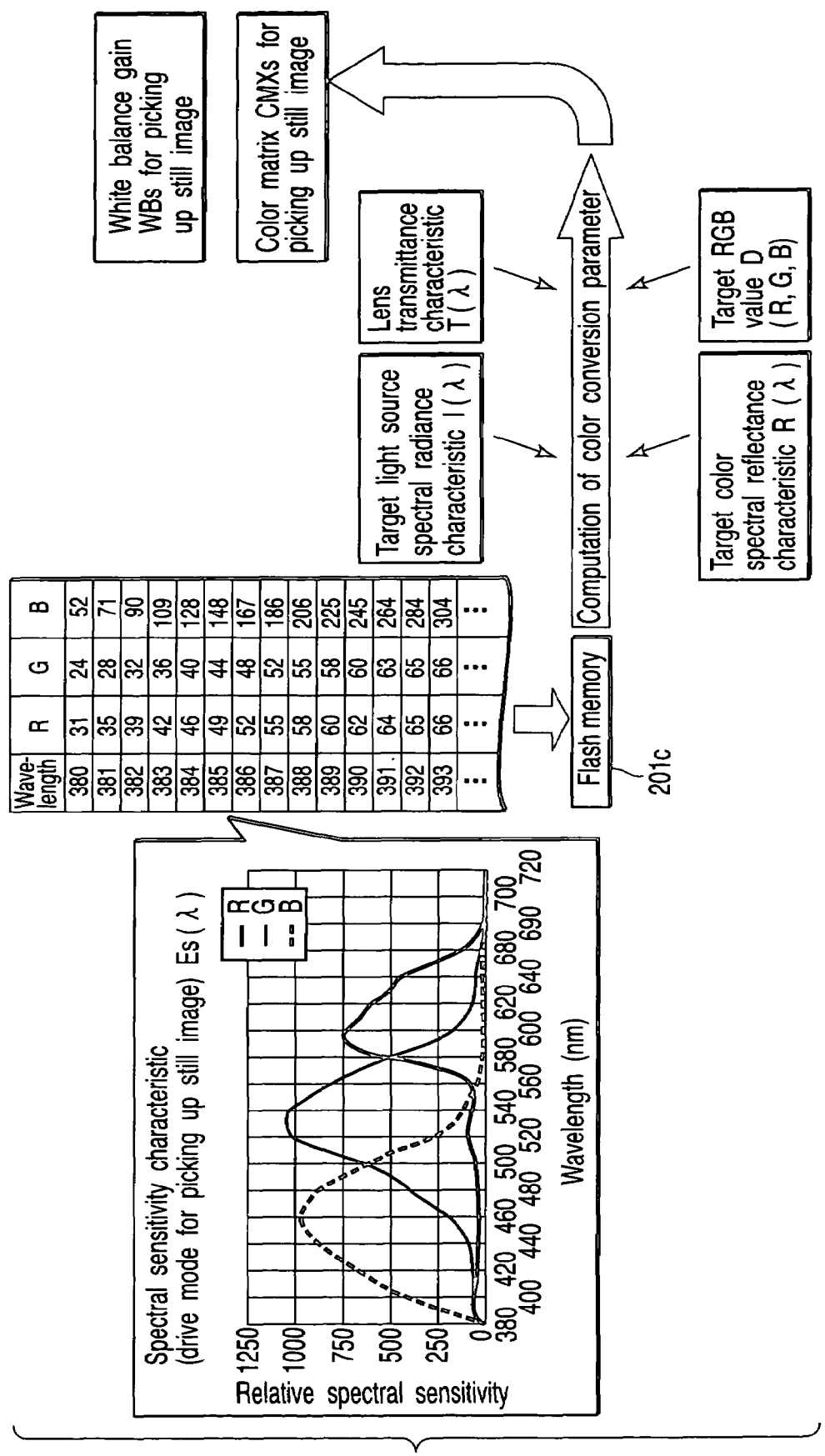
FIG. 3 is a schematic illustration of the concept of computationally determining the white balance gain and the color matrix for picking up a still image in the first embodiment.
Figure 4:
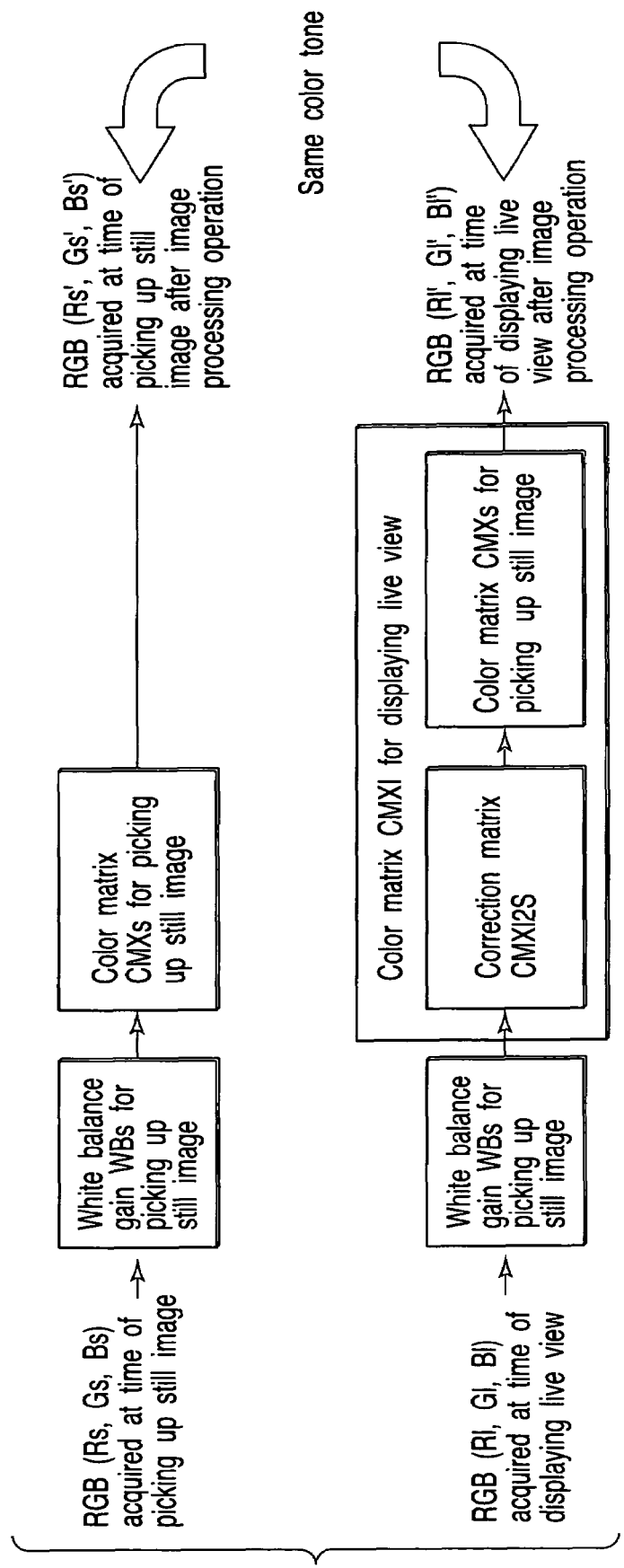
FIG. 4 is a schematic illustration of the concept of white balance correction and that of color-conversion of the first embodiment.

Now, white balance correction and color-conversion that take a principal part of the electronic image pickup method of the first embodiment will be described below. FIG. 3 is a schematic illustration of the concept of computationally determining the white balance gains and the color matrixes for picking up a still image in the first embodiment. FIG. 4 is a schematic illustration of the concept of white balance correction and color-conversion of the first embodiment.

As described above, the flash memory 201c stores the spectral sensitivity characteristic $Es(\lambda)$ for picking up a still image. Firstly, when computing the white balance gains, each of the color components of the spectral sensitivity characteristic $Es(\lambda)$ for picking up a still image is multiplied by the lens transmittance characteristic $T(\lambda)$ and the target light source spectral radiance characteristic $I(\lambda)$ within the visible light wavelength range to determine the spectral sensitivity for R, G and B when the lens unit 100 is mounted. Then, the white balance gains WBs are computed from the obtained spectral sensitivities for R, G and B. More specifically, the white balance R gain is computed by means of the R spectral sensitivity/G spectral sensitivity and the white balance B gain is computed by means of the B spectral sensitivity/G spectral sensitivity.

Secondary, when computing the color matrix, each of the color components of the spectral sensitivity characteristic $Es(\lambda)$ for picking up a still image is multiplied by the lens transmittance characteristic $T(\lambda)$, the target light source spectral radiance characteristic $I(\lambda)$ and the target spectral reflectance characteristic $R(\lambda)$ within the visible light wavelength range to determine the spectral sensitivity for R, G and B when the lens unit 100 is mounted. The matrix that makes the spectral sensitivity of the target color equal to the value indicated by the target color RGB value $D(R, G, B)$ is the color matrix CMXs for picking up a still image. The color matrix CMXs for picking up a still image is a 3×3 matrix and it is necessary to define three colors as target colors (e.g., cyan, the skin color of men and green).

The white balance gain WBs for picking up a still image and the color matrix CMXs for picking up a still image as described above correspond to the first color-conversion parameter.

Now, white balance correction and color-conversion in the drive mode for picking up a still image and those in the drive mode for displaying a live view will be described below.

Firstly, in the drive mode for picking up a still image, the image data Rs, Gs, Bs acquired from the image pickup module 201 and synchronized by the synchronization circuit 204a are input to the WB correction circuit 204b. The WB correction circuit 204b multiplies the Rs data and the Bs data of the input image data respectively by the R gain and the B gain of the white balance gains WBs for picking up a still image for the white balance correction. Subsequently, the color-conversion circuit 204c multiplies the Rs, Gs and Bs data that have been corrected for white balance by the color matrix CMXs for picking up a still image for color-conversion.

On the other hand, in the drive mode for displaying a live view, the image data Rl, Gl, Bl acquired from the image pickup module 201 in a state where color mixing takes place and synchronized by the synchronization circuit 204a are input to the WB correction circuit 204b. The WB correction circuit 204b multiplies the Rl data and the Bl data of the input image data respectively by the R gain and the B gain of the white balance gains WBs for picking up a still image for white balance correction. Subsequently, the color-conversion circuit 204c multiplies the Rl, Gl, and Bl data that have been corrected for white balance by the color matrix CMXl for displaying a live view for color-conversion.

The color matrix CMXl for displaying a live view is a matrix that can be computationally obtained by multiplying the color matrix CMXs for picking up a still image by the correction matrix CMXl2s stored in the flash memory 212 from the left. As color-conversion is realized by means of the color matrix CMXl for displaying a live view, it is possible to realize the same color reproducibility for both picking up a still image and displaying a live view.

Now, the reason for this will be described below. Color mixing takes place in the image pickup element 201a mostly when electric charges leak in a same direction and the quantity of leaked electric charges is substantially determined by the structure and the drive system of the image pickup element. Thus, let us assume a color mixing model where the electric charge of the pixel immediately below a pixel that is being driven leaks out and the leakage ratio is same and constant for each color (see FIG. 2). If the ratio of the electric charge of a Gb pixel leaking out to an R pixel is k1, that of the electric charge of a B pixel leaking out to an Gr pixel is k2 while the ratio of the electric charge of an R pixel leaking out to a Gb pixel is k3 and that of the electric charge of a Gr pixel leaking out to a B pixel is k4 in such a color mixing model, the image signals Rl, Grl, Gbl and Bl that are output from each color component where color mixing takes place are expressed by (formula 1) below.

$$\begin{pmatrix} Rl \\ Grl \\ Gbl \\ Bl \end{pmatrix} = \begin{pmatrix} 1 & 0 & k1 & 0 \\ 0 & 1 & 0 & k2 \\ k3 & 0 & 1 & 0 \\ 0 & k4 & 0 & 1 \end{pmatrix} \times \begin{pmatrix} Rs \\ Grs \\ Gbs \\ Bs \end{pmatrix} \quad \text{(formula 1)}$$

As seen from the (formula 1), the image signals Rl, Grl, Gbl and Bl after the color mixing can be determined by means of linear transformation of the image signals Rs, Grs, Gbs and Bs before the color mixing, using a predetermined conversion matrix. When the image signals in a state where color mixing takes place are synchronized by the synchronization circuit 204a, the image signals R, G and B after the synchronization are expressed as below.

R=R'

G=(Gr'+Gb')/2 \quad (formula 2)

B=B'

Therefore, after the color mixing, the model is expressed by (formula 3) blow.

$$\begin{pmatrix} Rl \\ Grl \\ Gbl \\ Bl \end{pmatrix} = \begin{pmatrix} 1 & 0 & 0 & 0 \\ 0 & 1/2 & 1/2 & 0 \\ 0 & 0 & 0 & 1 \end{pmatrix} \begin{pmatrix} 1 & 0 & k1 & 0 \\ 0 & 1 & 0 & k2 \\ k3 & 0 & 1 & 0 \\ 0 & k4 & 0 & 1 \end{pmatrix} \times \begin{pmatrix} Rs \\ Grs \\ Gbs \\ Bs \end{pmatrix} \quad \text{(formula 3)}$$

$$= \begin{pmatrix} 1 & 0 & k1 & 0 \\ k3/2 & 1/2 & 1/2 & k2/2 \\ 0 & k4 & 0 & 1 \end{pmatrix} \times \begin{pmatrix} Rs \\ Grs \\ Gbs \\ Bs \end{pmatrix}$$

The correction matrix CMXl2s is determined by utilizing a model equivalent to that of the (formula 3) where color mixing takes place after synchronization. If the inverse matrix of the correction matrix CMXl2s (that corresponds to a conversion matrix equivalent to the (formula 3)) is CMXs2l, it is defined by (formula 4) shown below.

$$CMXs2l \times \begin{pmatrix} 1 & 0 & 0 & 0 \\ 0 & 1/2 & 1/2 & 0 \\ 0 & 0 & 0 & 1 \end{pmatrix} = \quad \text{(formula 4)}$$

$$\begin{pmatrix} 1 & 0 & 0 & 0 \\ 0 & 1/2 & 1/2 & 0 \\ 0 & 0 & 0 & 1 \end{pmatrix} \begin{pmatrix} 1 & 0 & k1 & 0 \\ 0 & 1 & 0 & k2 \\ k3 & 0 & 1 & 0 \\ 0 & k4 & 0 & 1 \end{pmatrix}$$

Thus, CMXs2l is expressed by (formula 5) shown below.

$$CMXs2l = \begin{pmatrix} 1 & 0 & 0 & 0 \\ 0 & 1/2 & 1/2 & 0 \\ 0 & 0 & 0 & 1 \end{pmatrix} \begin{pmatrix} 1 & 0 & k1 & 0 \\ 0 & 1 & 0 & k2 \\ k3 & 0 & 1 & 0 \\ 0 & k4 & 0 & 1 \end{pmatrix} \begin{pmatrix} 1 & 0 & 0 \\ 0 & 1 & 0 \\ 0 & 1 & 0 \\ 0 & 0 & 1 \end{pmatrix} \quad \text{(formula 5)}$$

$$= \begin{pmatrix} 1 & k1 & 0 \\ k3/2 & 1 & k2/2 \\ 0 & k4 & 1 \end{pmatrix}$$

The inverse matrix of CMXs2l of the (formula 5) is the correction matrix CMXl2s.

As described above, multiplying the image data Rl, Gl and Bl obtained at the time of displaying a live view by the correction matrix CMXl2s is substantially equal to converting the spectral sensitivity characteristics of the image pickup element corresponding to the time of displaying a live view (after color mixing) to the spectral sensitivity characteristics of the image pickup element corresponding the time of picking up a still image (before color mixing) (see FIG. 5). On the basis of this idea, the image data Rs, Gs and Bs before color mixing takes place are restored from the image data Rl, Gl and Bl in a state where color mixing takes place as obtained at the time of displaying a live view by linear transformation, utilizing the fact that the color-conversion circuit 204c operates for linear transformation. Then, the same color-conversion is performed as that at the time of picking up a still image. Thus, it is possible to achieve the same color reproducibility for both displaying a live view and picking up a still image.

Note that FIG. 5 also shows that it is possible to computationally determine the spectral sensitivity characteristics of the image pickup element at the time of displaying a live view by multiplying the spectral sensitivity characteristics of the image pickup element at the time of picking up a still image by the inverse matrix CMXs2l of the correction matrix CMXl2s.

Figure 6:
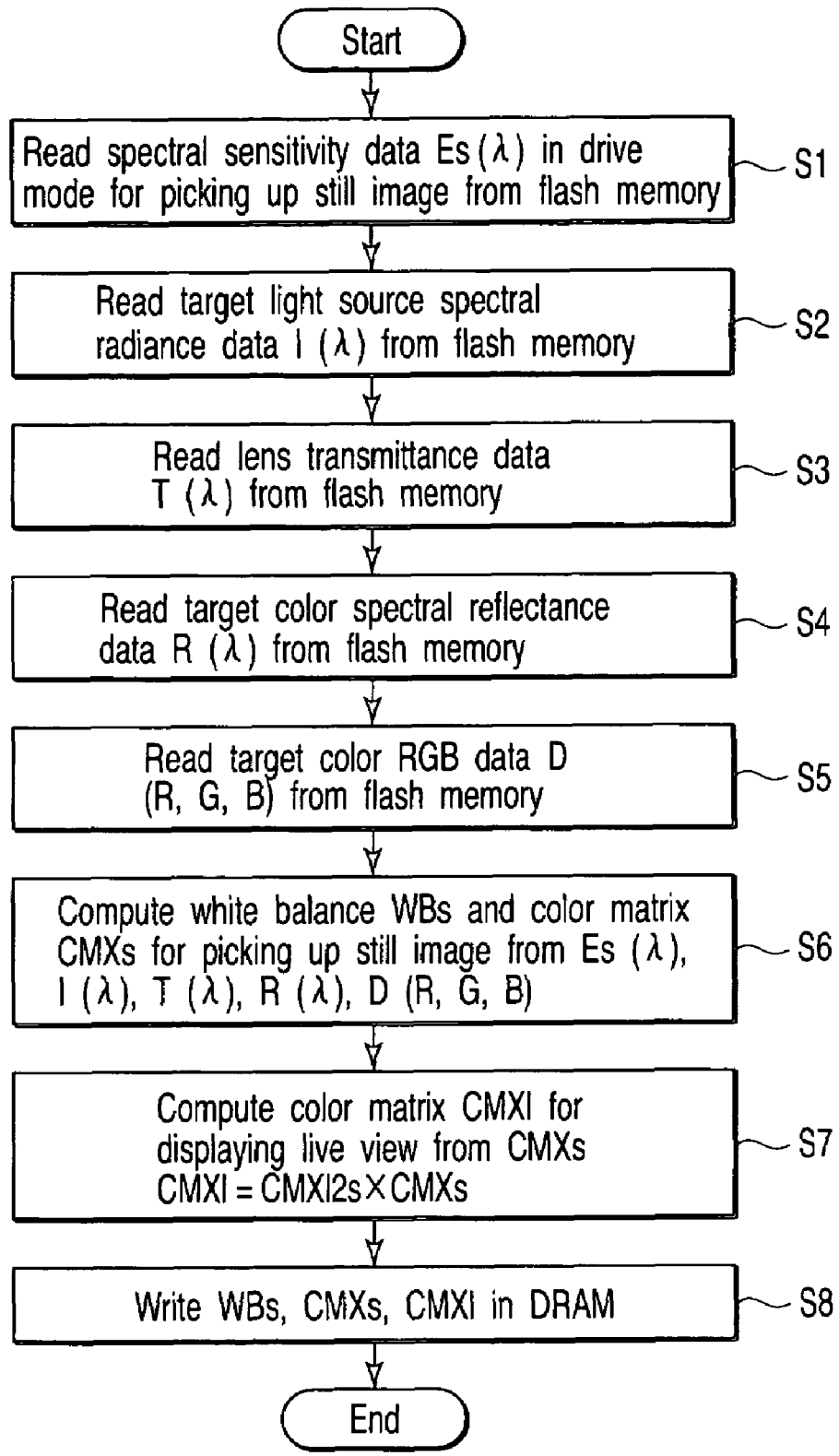
FIG. 6 is a flowchart of the computation process to be executed by the microcomputer of the first embodiment before an image pickup operation.

Now, the flow of the actual computation process will be described below. FIG. 6 is a flowchart of the computation process to be executed by the microcomputer 210 of the first embodiment before an image pickup operation. Note that only the process relating to white balance correction and color-conversion will be described here.

Firstly, the microcomputer 210 reads the spectral sensitivity characteristic Es($\lambda$) of the image pickup element for picking up a still image from the flash memory 201c (Step S1). Then, the microcomputer 210 reads the target light source spectral radiance characteristic I($\lambda$) from the flash memory 212 (Step S2), the lens transmittance characteristic T($\lambda$) from the flash memory 103 of the lens unit 100 (Step S3), the target spectral reflectance characteristic R($\lambda$) from the flash memory 212 (Step S4) and the target color RGB value D(R, G, B) from the flash memory 212 (Step S5). The sequence of reading the data in Steps S1 through S5 is not limited to the one illustrated in FIG. 6 and may be changed appropriately.

Subsequently, the microcomputer 210 computationally determines the white balance gain WBs and the color matrix CMXs for picking up a still image from the read data in a manner as described above (Step S6). Additionally, the microcomputer 210 performs a matrix computation of $$CMXl = CMXl2s \times CMXs$$

to determine the color matrix CMXl for displaying a live view (Step S7). Thereafter, the microcomputer 210 writes the white balance gain WBs for picking up a still image, the color matrix CMXs for picking up a still image and the color matrix CMXl for displaying a live view that are obtained in a manner as described above in the DRAM 203 (Step S8). Then, the microcomputer 210 ends the process of the flowchart of FIG. 6.

Figure 7:
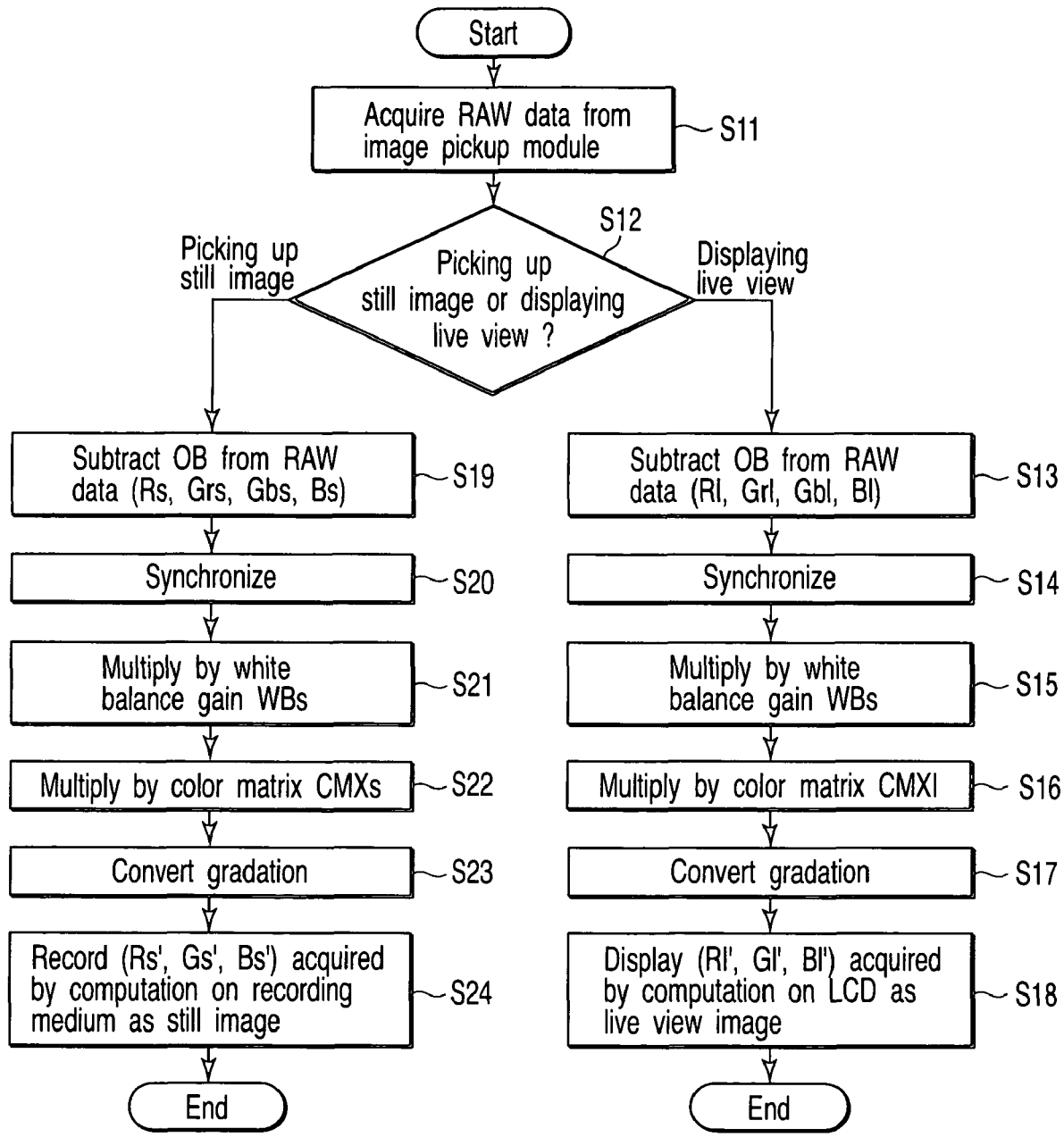
FIG. 7 is a flowchart of the computation process to be executed by the microcomputer of the first embodiment in a still image pickup operation.

FIG. 7 is a flowchart of the computation process to be executed by the microcomputer 210 of the first embodiment in a still image pickup operation. Referring to FIG. 7, firstly, the microcomputer 210 acquires the image data (RAW data) from the image pickup module 201 (Step S11). Then, the microcomputer 210 determines if the acquired image data are those for picking up a still image or those for displaying a live view (Step S12). This determining operation can be performed simply by detecting if the release button of the operation section 211 is depressed by the user or not. In other words, the image data acquired before the user depresses the release button are those for displaying a live view whereas the image data acquired when the release button is depressed are those for picking up a still image.

When it is determined in Step S12 that the acquired image data are for displaying a live view, an OB subtraction circuit (not shown) executes an OB subtraction process by means of (Step S13). In the OB subtraction process, the black level of the acquired image data is made to be equal to 0 by subtracting the data for optical black (OB) from the image data. Then, the OB subtraction circuit outputs the image data to the synchronization circuit 204a to execute a synchronization process by means of the synchronization circuit 204a (Step S14). Subsequently, the microcomputer 210 reads the white balance gain WBs for picking up a still image stored in the DRAM 203 in Step S8 of FIG. 6 and outputs it to the WB correction circuit 204b. The WB correction circuit 204b performs an operation of white balance correction of multiplying the image data by the white balance gain WBs given by the microcomputer 210 (Step S15). Thereafter, the microcomputer 210 reads the color matrix CMXl for displaying a live view stored in the DRAM 203 in Step S8 of FIG. 6 and outputs it to the color-conversion circuit 204c. The color-conversion circuit 204c performs an operation of color-conversion of multiplying the image data by the color matrix CMXl for displaying a live view given by the microcomputer 210 (Step S16). Then, the gamma conversion circuit 204d performs an operation of gamma conversion on the output of the color-conversion circuit 204c (Step S17) and stores the image data (Rl', Gl', Bl') obtained as a result of the computation process in the DRAM 203.

After the above-described image processing operation, the LCD driver 205 reads the image data (Rl', Gl', Bl') from the DRAM 203 and displays them as a live view image on the LCD (Step S18). Thus, as a result of the above-described process, the color reproducibility at the time of displaying a live view is made to agree with the color reproducibility at the time of picking up a still image.

When, on the other hand, it is determined in Step S12 that the acquired image data are for picking up a still image, the microcomputer 210 executes an OB subtraction process of making the black level of the acquired image data to be equal to 0 by subtracting the data for optical black (OB) from the image data by means of an OB subtraction circuit (not shown) (Step S19). Then, the OB subtraction circuit 210 outputs the image data to the synchronization circuit 204a to execute a synchronization process by means of the synchronization circuit 204a (Step S20). Subsequently, the microcomputer 210 reads the white balance gain WBs for picking up a still image stored in the DRAM 203 in Step S8 of FIG. 6 and outputs it to the WB correction circuit 204b. The WB correction circuit 204b performs an operation of white balance correction of multiplying the image data by the white balance gain WBs given by the microcomputer 210 (Step S21). Thereafter, the microcomputer 210 reads the color matrix CMXs for picking up a still image stored in the DRAM 203 in Step S8 of FIG. 6 and outputs it to the color-conversion circuit 204c. The color-conversion circuit 204c performs an operation of color-conversion of multiplying the image data by the color matrix CMXs for picking up a still image given by the microcomputer 210 (Step S22). Then, the gamma conversion circuit 204d performs an operation of gamma conversion on the output of the color-conversion circuit 204c (Step S23) and stores the image data (Rs', Gs', Bs') obtained as a result of the computation process in the DRAM 203.

After the above-described image processing operation, the compression/decompression circuit 207 reads the image data (Rs', Gs', Bs') from the DRAM 203 and executes a compression process and the compressed image data are then recorded on the recording medium 209 (Step S24).

As described above, with the first embodiment, it is possible to provide the same color reproducibility both for picking up a still image and for displaying a live view without storing the spectral sensitivity characteristics of the image pickup element for a live view in the flash memory.

Additionally, the comprehensive spectral sensitivity characteristics of the camera can change not only due to the spectral sensitivity characteristics of the image pickup element but also due to the spectral transmittance characteristic of the optical lens mounted in the camera main body and the spectral radiance characteristic of the light source at the time picking up a still image and so on. In other words, when a different light source is used, or when a camera having a detachably fitted optical lens such as a single-lens reflex camera is used, it is necessary to computationally determine the white balance gain and color matrix after measuring the comprehensive spectral sensitivity characteristics of the camera before each image pickup operation. Then, the spectral sensitivity characteristics have to be measured when displaying a live view and also when picking up a still image with the conventional technique. However, with the technique of the first embodiment, it is only necessary to measure the spectral sensitivity characteristics for picking up a still image and compute the white balance gain WBs and the color matrix CMXs.

In other words, the white balance gain WBs for picking up a still image can be used as the white balance gain for displaying a live view without any modification and the color matrix CMXl for displaying a live view can be obtained by linear transformation of the color matrix CMXs for picking up a still image by means of the correction matrix CMXl2s. Thus, the net result is a reduced amount of computations required for white balance correction and color-conversion.

Second Embodiment

Now, the second embodiment of the present invention will be described below. The color-conversion circuit 204c is described above as a circuit for linearly converting the output of the WB correction circuit 204b by means of a predetermined color matrix for the first embodiment. However, a color-conversion circuit is not necessarily a circuit for linear transformation and may be a circuit for non-linear transformation. The second embodiment can accommodate a situation where the color-conversion circuit 204c executes non-linear transformation. Thus, the second embodiment of electronic image pickup apparatus has a configuration basically same as that of FIG. 1. In other words, the second embodiment differs from the first embodiment in that the color-conversion circuit 204c executes a non-linear transformation process on the output of the WB correction circuit 204b according to a predetermined lookup table.

Figure 8:
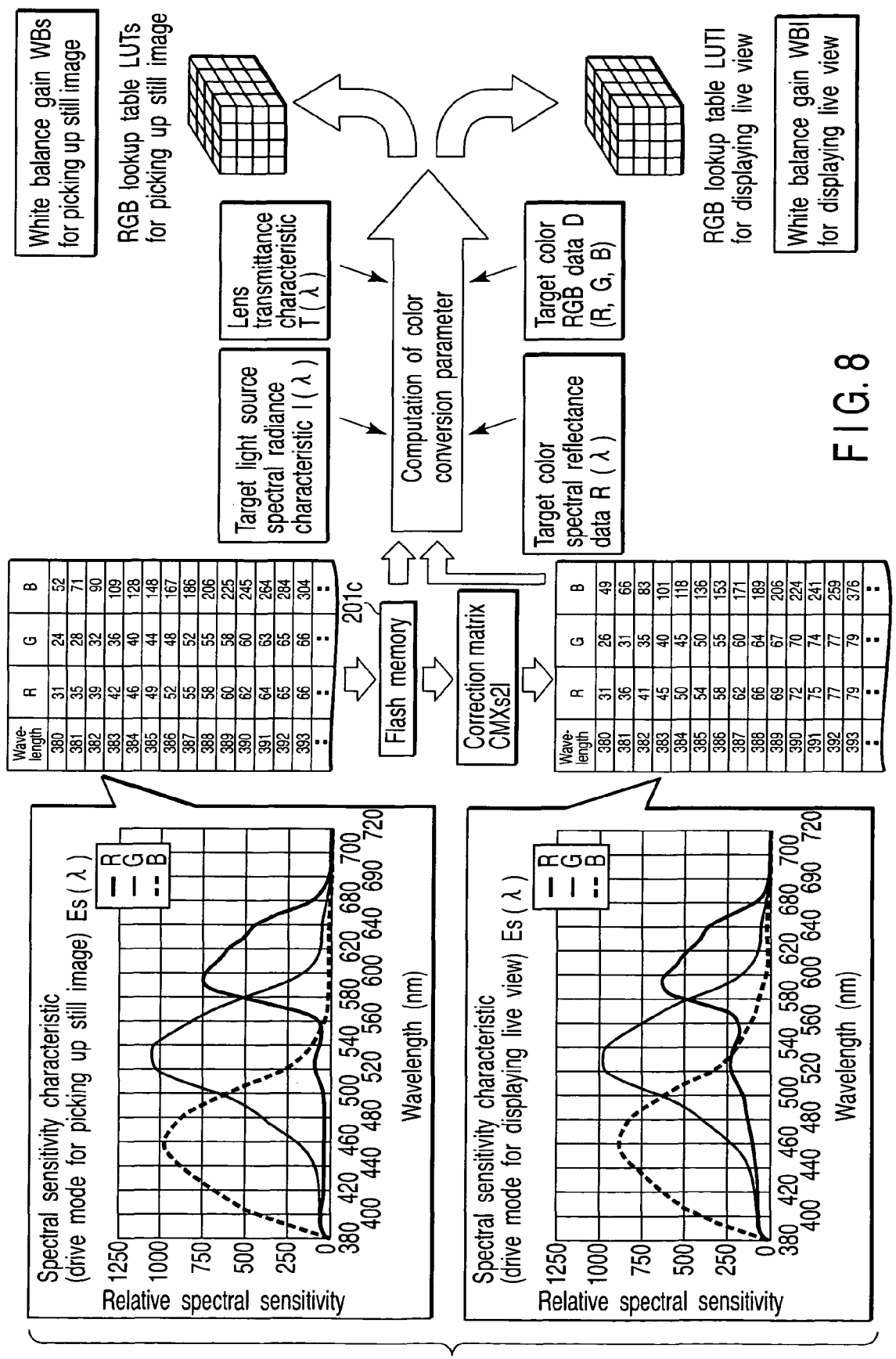
FIG. 8 is a schematic illustration of the concept of computationally determining the white balance gain and the color matrix for picking up a still image in the second embodiment.
Figure 9:
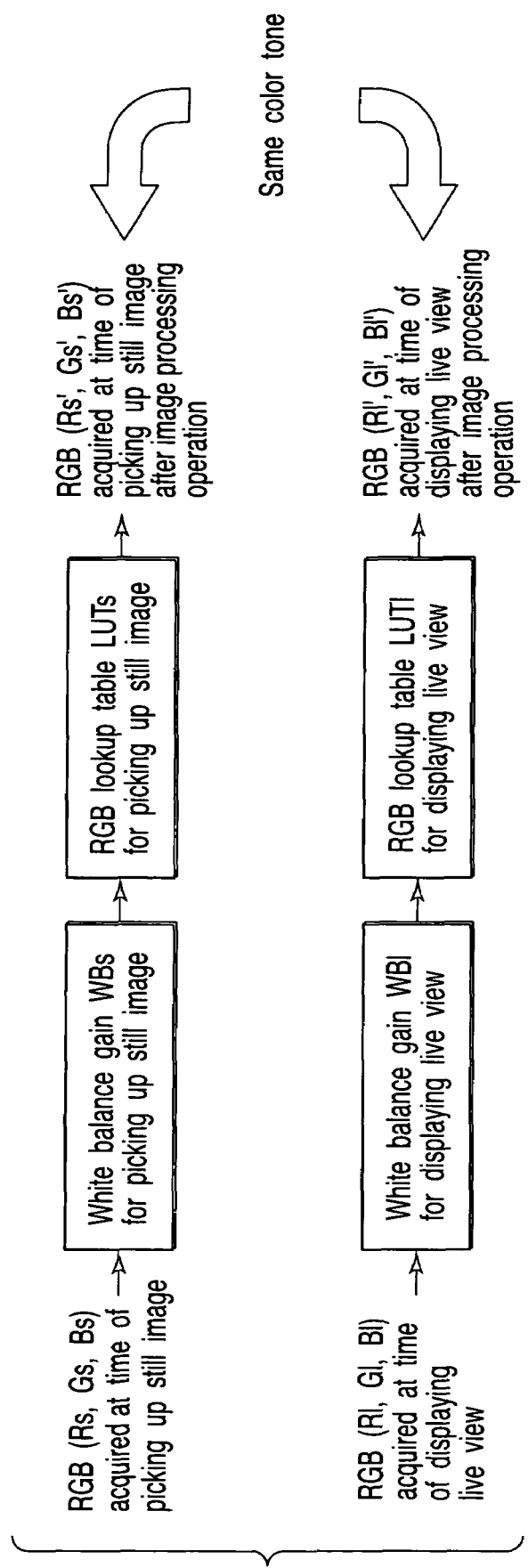
FIG. 9 is a schematic illustration of the concept of white balance correction and that of color-conversion of the second embodiment.

Now, white balance correction and color-conversion that take a principal part of the electronic image pickup method of the second embodiment will be described below. FIG. 8 is a schematic illustration of the flow of the white balance correction and the color-conversion by the second embodiment. FIG. 9 is a schematic illustration of the concept of white balance correction and that of color-conversion of the second embodiment.

Like the first embodiment, only the spectral sensitivity characteristic Es(λ) for picking up a still image is stored in the flash memory 201c. The technique of computationally determining the white balance gain WBs for picking up a still image of this embodiment is same as that of the first embodiment and hence will not be described here any further. When determining the RGB lookup table LUTs for picking up a still image, firstly each of the color components of the spectral sensitivity characteristic Es(λ) for picking up a still image is multiplied by the lens transmittance characteristic T(λ), the target light source spectral radiance characteristic I(λ) and the target spectral reflectance characteristic R(λ) within the visible light wavelength range to determine the spectral sensitivity for R, G and B when the lens unit 100 is mounted. Then, the RGB lookup table LUTs for picking up a still image is determined by computationally determining the conversion coefficient that makes the spectral sensitivity of the target color to be represented by a value indicated by the target color RGB value D(R, G, B) for each wavelength.

Subsequently, both the white balance gain WBl and the RGB lookup table LUTl for displaying a live view are computationally determined. Note, the RGB lookup table LUTs for picking up a still image and the RGB lookup table LUTl for displaying a live view cannot be determined from each other by linear transformation. Therefore, as in the case of the RGB lookup table LUTs for picking up a still image, the white balance gain WBl for displaying a live view and the lookup table LUTl for displaying a live view are computationally determined from the spectral sensitivity characteristic El(λ) for displaying a live view.

As described above by referring to FIG. 5, the spectral sensitivity characteristic El(λ) of the image pickup element for the time of displaying a live view can be determined by multiplying the spectral sensitivity characteristic Es(λ) of the image pickup element for the time of picking up a still image by the correction matrix CMXs2l. Thus, it is not necessary to store the spectral sensitivity characteristics El(λ) of the image pickup element for the time of displaying a live view in the flash memory 201c. In other words, it is only necessary to store the correction matrix CMXs2l in the flash memory 212 for that purpose. Note that the microcomputer 210 operates as spectral sensitivity characteristic computing section to computationally determine the spectral sensitivity characteristic El(λ) of the image pickup element for the time of displaying a live view.

Now, white balance correction and color-conversion in the drive mode for picking up a still image and those in the drive mode for displaying a live view will be described below.

In the drive mode for picking up a still image, the image data Rs, Gs, Bs acquired from the image pickup module 201 and synchronized by the synchronization circuit 204a are input to the WB correction circuit 204b. The WB correction circuit 204b multiplies the Rs data and the Bs data of the input image data respectively by the R gain and the B gain of the white balance gain WBs for picking up a still image for the purpose of white balance correction. Thereafter, the color-conversion circuit 204c executes a color-conversion process on the Rs, Gs, Bs data corrected for white balance by means of the RGB lookup table LUTs for picking up a still image.

In the drive mode for displaying a live view, the image data Rl, Gl, Bl acquired from the image pickup module 201 in a state where color mixing takes place and synchronized by the synchronization circuit 204a are input to the WB correction circuit 204b. The WB correction circuit 204b multiplies the Rl data and the Bl data of the input image data respectively by the R gain and the B gain of the white balance gain WBl for displaying a live view for the purpose of white balance correction. Thereafter, the color-conversion circuit 204c executes a color-conversion process on the Rl, Gl, Bl data corrected for white balance by means of the RGB lookup table LUTl for displaying a live view.

Figure 10:
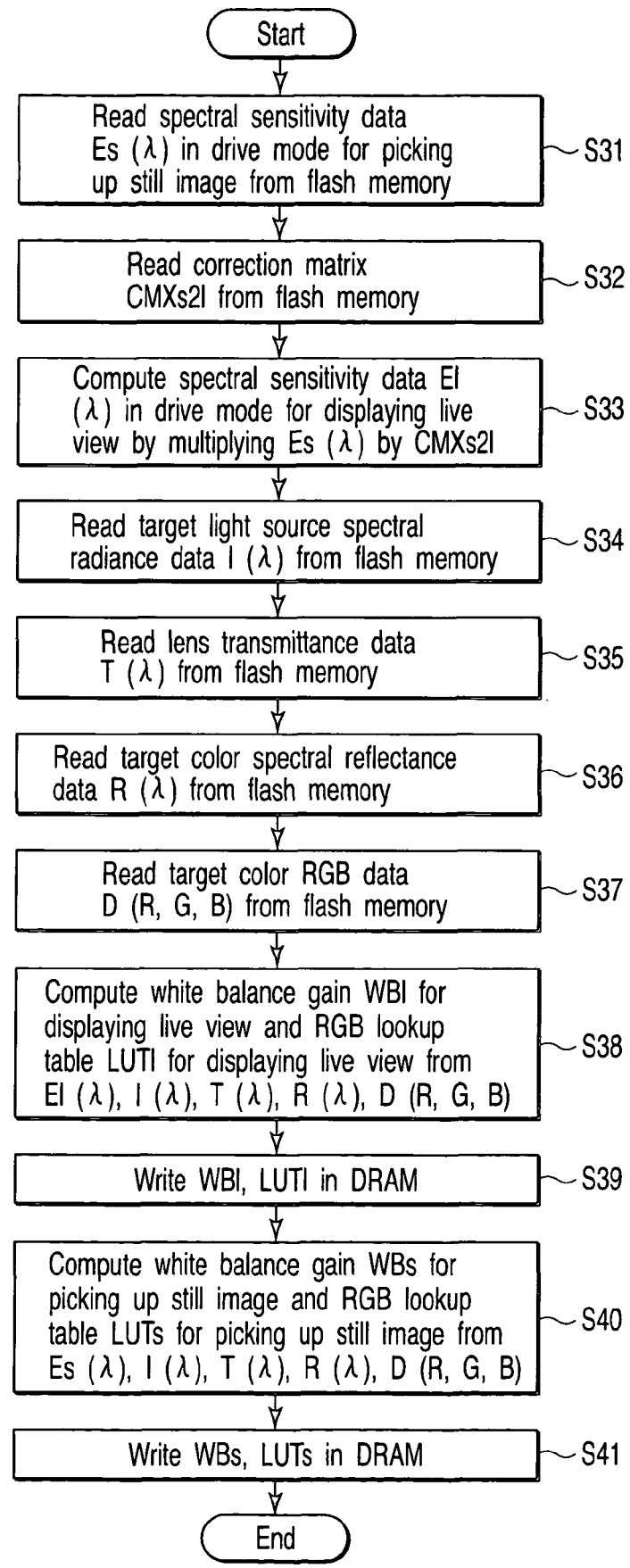
FIG. 10 is a flowchart of the computation process to be executed by the microcomputer of the second embodiment before an image pickup operation.

Now, the flow of the actual computation process will be described below. FIG. 10 is a flowchart of the computation process to be executed by the microcomputer 210 of the second embodiment before an image pickup operation. Note that only the process relating to white balance correction and color-conversion will be described here.

Firstly, the microcomputer 210 reads the spectral sensitivity characteristic Es(λ) of the image pickup element for picking up a still image from the flash memory 201c (Step S31). Then, the microcomputer 210 reads correction matrix CMXs2l from the flash memory 212 (Step S32). Thereafter, the microcomputer 210 computationally determines the spectral sensitivity characteristic El(λ) of the image pickup element for the time of displaying a live view by multiplying the spectral sensitivity characteristic Es(λ) for the time of picking up a still image by the correction matrix CMXs2l (multiplying the R, G, B data for each wavelength of the spectral sensitivity characteristic Es(λ) by the correction matrix CMXs2l from the left) (Step S33).

Then, the microcomputer 210 reads the target light source spectral radiance characteristic I(λ) from the flash memory 212 (Step S34), the lens transmittance characteristic T(λ) from the flash memory 103 of the lens unit 100 (Step S35), the target spectral reflectance characteristic R(λ) from the flash memory 212 (Step S36) and the target color RGB value D(R, G, B) from the flash memory 212 (Step S37).

Thereafter, the microcomputer 210 computationally determines the white balance gain WBl for displaying a live view and the lookup table LUTl for displaying a live view from the spectral sensitivity characteristic El(λ) obtained in Step S33 and the data read in Steps S34 through S37 (Step S38). Then, the microcomputer 210 writes the white balance gain WBl for displaying a live view and the lookup table LUTl for displaying a live view in the DRAM 203 (Step S39). Subsequently, the microcomputer 210 computationally determines the white balance gain WBs for picking up a still image and the lookup table LUTs for picking up a still image from the spectral sensitivity characteristic Es(λ) read in Step S31 and the data read in Steps S34 through S37 (Step S40). Then, the microcomputer 210 writes the white balance gain WBs for picking up a still image and the lookup table LUTs for picking up a still image in the DRAM 203 (Step S41) to end the process of the flowchart of FIG. 10.

Figure 11:
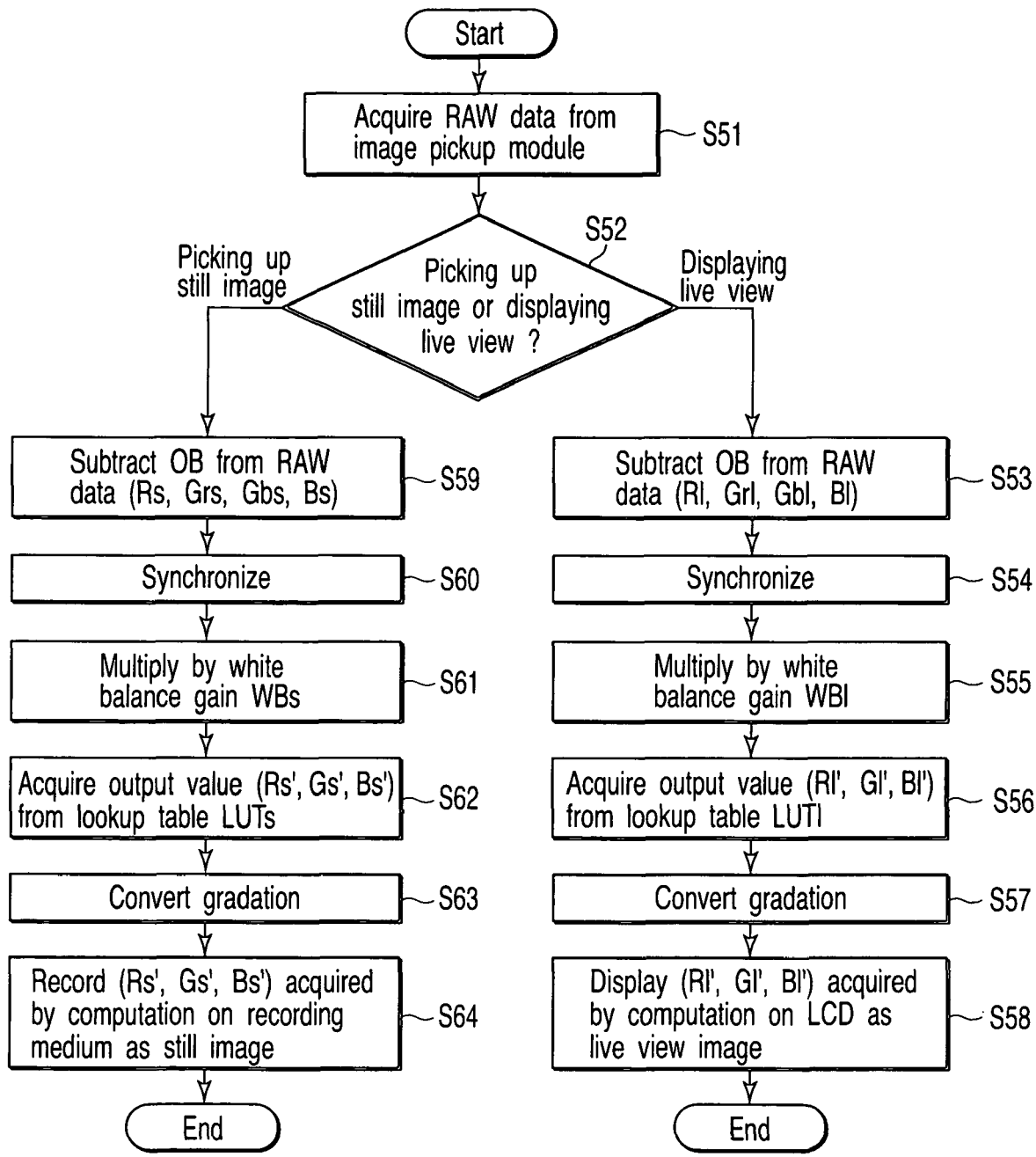
FIG. 11 is a flowchart of the computation process to be executed by the microcomputer of the second embodiment in a still image pickup operation.

FIG. 11 is a flowchart of the computation process to be executed by the microcomputer 210 of the second embodiment in a still image pickup operation. Referring to FIG. 11, firstly, the microcomputer 210 acquires the image data (RAW data) from the image pickup module 201 (Step S51). Then, the microcomputer 210 determines if the acquired image data are those for picking up a still image or those for displaying a live view (Step S52).

When it is determined in Step S52 that the acquired image data are for displaying a live view, the microcomputer 210 executes an OB subtraction process of making the black level of the acquired image data to be equal to 0 by subtracting the data for optical black (OB) from the image data by means of an OB subtraction circuit (not shown) (Step S53). Then, the OB subtraction circuit outputs the image data to the synchronization circuit 204a to execute a synchronization process by means of the synchronization circuit 204a (Step S54). Subsequently, the microcomputer 210 reads the white balance gain WBl for displaying a live view stored in the DRAM 203 in Step S39 of FIG. 10 and outputs it to the WB correction circuit 204b. The WB correction circuit 204b performs an operation of white balance correction of multiplying the image data by the white balance gain WBl given by the microcomputer 210 (Step S55). Thereafter, the microcomputer 210 reads the lookup table LUTl for displaying a live view stored in the DRAM 203 in Step S39 of FIG. 10 and outputs it to the color-conversion circuit 204c. The color-conversion circuit 204c performs an operation of color-conversion by means of the lookup table LUTl for displaying a live view given from the microcomputer 210 (Step S56). Then, the gamma conversion circuit 204d performs an operation of gamma conversion on the output of the color-conversion circuit 204c (Step S57) and stores the image data (Rl', Gl', Bl') obtained as a result of the computation process in the DRAM 203.

After the above-described image processing operation, the LCD driver 205 reads the image data (Rl', Gl', Bl') from the DRAM 203 and displays them as a live view image on the LCD (Step S58). Thus, as a result of the above-described process, the color reproducibility at the time of displaying a live view is made to agree with the color reproducibility at the time of picking up a still image.

When, on the other hand, it is determined in Step S52 that the acquired image data are for picking up a still image, the microcomputer 210 executes an OB subtraction process of making the black level of the acquired image data to be equal to 0 by subtracting the data for optical black (OB) from the image data by means of an OB subtraction circuit (not shown) (Step S59). Then, the OB subtraction circuit outputs the image data to the synchronization circuit 204a to execute a synchronization process by means of the synchronization circuit 204a (Step S60). Subsequently, the microcomputer 210 reads the white balance gain WBs for picking up a still image stored in the DRAM 203 in Step S41 of FIG. 10 and outputs it to the WB correction circuit 204b. The WB correction circuit 204b performs an operation of white balance correction of multiplying the image data by the white balance gain WBs for picking up a still image given by the microcomputer 210 (Step S61). Thereafter, the microcomputer 210 reads the lookup table LUTs for picking up a still image stored in the DRAM 203 in Step S41 of FIG. 10 and outputs it to the color-conversion circuit 204c. The color-conversion circuit 204c performs an operation of color-conversion by means of the lookup table LUTs for picking up a still image given by the microcomputer 210 (Step S62). Then, the gamma conversion circuit 204d performs an operation of gamma conversion on the output of the color-conversion circuit 204c (Step S63) and stores the image data (Rs', Gs', Bs') obtained as a result of the computation process in the DRAM 203.

After the above-described image processing operation, the compression/decompression circuit 207 reads the image data (Rs', Gs', Bs') from the DRAM 203 and executes a compression process and the compressed image data are then recorded on the recording medium 209 (Step S64).

As described above, with the second embodiment, it is possible to determine the spectral sensitivity characteristics of the image pickup element for displaying a live view by means of a simple technique of linearly converting the spectral sensitivity characteristics of the image pickup element for picking up a still image by means of a correction matrix if the conversion of the color-conversion circuit is not linear transformation. Thus, it is possible to provide the same color reproducibility both for picking up a still image and for displaying a live view by means of a simple arrangement.

Note that the technique of the second embodiment is applicable when the conversion of the color-conversion circuit is linear transformation.

While the above embodiments of electronic image pickup apparatus are described in term of a single-lens reflex camera, the above-described techniques can equally be applied to compact cameras. In the case of a compact camera, the lens transmittance characteristic T(λ) does not change and hence the overall spectral sensitivity of the camera is determined by the target light source spectral radiance characteristic I(λ). Therefore, the color-conversion parameters such as the white balance gain WBs and the color matrix CMXs for picking up a still image may be computationally determined in advance for each light source.

While the image pickup element 201a of each of the above embodiments can be driven in a drive mode for displaying a live view, which is the second drive mode, in the above description, the second drive mode is not necessarily limited to a drive mode recording for displaying a live view so long as it is adapted to thin the output of the image pickup element and read it out. For instance, the second drive mode may be a drive mode for picking up a moving image or a drive mode for only a partial region of a still image in place of a drive mode for displaying a live view.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic image pickup apparatus comprising:
   a color image pickup element which has a plurality of drive modes including at least a first drive mode and a second drive mode;
   a color-conversion parameter storage section which stores a first color-conversion parameter for color-converting color data acquired by the color image pickup element in the first drive mode;
   a color-conversion parameter computing section which computes from the first color-conversion parameter a second color-conversion parameter for color-converting color data acquired by the color image pickup element in the second drive mode to be equivalent in color reproducibility to the color data acquired by the color image pickup element in the first drive mode;
   a computation parameter storage section which stores a computation parameter for computing the second color-conversion parameter; and
   a color-conversion section which color-converts the color data acquired by the color image pickup element in the first drive mode according to the first color-conversion parameter and also color-converts the color data acquired by the color image pickup element in the second drive mode according to the second color-conversion parameter,
   wherein the first color-conversion parameter is a first color matrix for use with the first drive mode, the computation parameter is a correction matrix, and the second color-conversion parameter is a second color matrix for use with the second drive mode.

2. The apparatus according to claim 1, wherein the first drive mode includes a drive mode for picking up a still image.

3. The apparatus according to claim 1, wherein the second drive mode includes a drive mode for displaying a live view.

4. The apparatus according to claim 1, wherein the color-conversion parameter computing section computes the second color-conversion parameter by linear transformation and the color-conversion section color-converts the color data acquired by the color image pickup element in the second drive mode by linear transformation according to the second color-conversion parameter.

5. The apparatus according to claim 1, wherein the computation parameter is independent of the color data.

6. The apparatus according to claim 1, wherein the computation parameter is computed based on a pixel to pixel electric charge leakage ratio.

7. An electronic image pickup apparatus, comprising:
   a color image pickup element which has a plurality of drive modes including at least a first drive mode and a second drive mode;
   an optical lens which converges light from a subject to the color image pickup element;
   a spectral sensitivity characteristics storage section which stores the spectral sensitivity characteristics corresponding to the first drive mode of the color image pickup element;
   a first color-conversion parameter computing section which computes a first color-conversion parameter for color-converting color data acquired by the color image pickup element in the first drive mode according to the spectral sensitivity characteristics;
   a second color-conversion parameter computing section which computes from the first color-conversion parameter a second color-conversion parameter for color-converting color data acquired by the color image pickup element in the second drive mode to be equivalent in color reproducibility to the color data acquired by the color image pickup element in the first drive mode;
   a computation parameter storage section which stores a computation parameter for computing the second color-conversion parameter; and
   a color-conversion section which color-converts the color data acquired by the color image pickup element in the first drive mode according to the first color-conversion parameter and also color-converts the color data acquired by the color image pickup element in the second drive mode according to the second color-conversion parameter,
   wherein the first color-conversion parameter is a first color matrix for use with the first drive mode, the computation parameter is a correction matrix, and the second color-conversion parameter is a second color matrix for use with the second drive mode.

8. The apparatus according to claim 7, wherein the first drive mode includes a drive mode for picking up a still image.

9. The apparatus according to claim 7, wherein the second drive mode includes a drive mode for displaying a live view.

10. The apparatus according to claim 7, wherein the second color-conversion parameter computing section computes the second color-conversion parameter by linear transformation and the color-conversion section color-converts the color data acquired by the color image pickup element in the second drive mode by linear transformation according to the second color-conversion parameter.

11. The apparatus according to claim 7, wherein the optical lens is adapted to be detachably fitted to the electronic image pickup apparatus and includes a spectral transmittance storage section for storing the spectral transmittance of the optical system of the optical lens; and
   the first color-conversion parameter computing section computes the first color-conversion parameter from the spectral transmittance and the spectral sensitivity characteristics.

12. The apparatus according to claim 7, wherein the computation parameter is independent of the color data.

13. The apparatus according to claim 7, wherein the computation parameter is computed based on a pixel to pixel electric charge leakage ratio.

14. An electronic image pickup method for a color image pickup element having a plurality of drive modes including at least a first drive mode and a second drive mode, the method comprising:
   subjecting a first color-conversion parameter to linear transformation to compute a second color-conversion parameter for color-converting color data acquired by the color image pickup element in the second drive mode to be equivalent in color reproducibility to color data acquired by the color image pickup element in the first drive mode; and color-converting the color data acquired by the color image pickup element in the first drive mode by subjecting the color data to linear transformation according to the first color-conversion parameter and also color-converting the color data acquired by the color image pickup element in the second drive mode by subjecting the color data to linear transformation according to the second color-conversion parameter, wherein the first color-conversion parameter is a first color matrix for use with the first drive mode, and the second color-conversion parameter is a second color matrix for use with the second drive mode.

15. The electronic image pickup method according to claim 14, wherein the first drive mode includes a drive mode for picking up a still image and the second drive mode includes a drive mode for displaying a live view.

16. An electronic image pickup method for a color image pickup element having a plurality of drive modes including at least a first drive mode and a second drive mode, the method comprising:

computing a first color-conversion parameter for color-converting color data acquired by the color image pickup element in the first drive mode according to spectral sensitivity characteristics corresponding to the first drive mode of the color image pickup element;

subjecting the first color-conversion parameter to linear transformation to compute a second color-conversion parameter for color-converting color data acquired by the color image pickup element in the second drive mode to be equivalent in color reproducibility to the color data acquired by the color image pickup element in the first drive mode; and color-converting the color data acquired by the color image pickup element in the first drive mode by subjecting the color data to linear transformation according to the first color-conversion parameter and also color-converting the color data acquired by the color image pickup element in the second drive mode by subjecting the color data to linear transformation according to the second color-conversion parameter, wherein the first color-conversion parameter is a first color matrix for use with the first drive mode, and the second color-conversion parameter is a second color matrix for use with the second drive mode.

17. The electronic image pickup method according to claim 16, wherein the first drive mode includes a drive mode for picking up a still image and the second drive mode includes a drive mode for displaying a live view.

* * * * *